April 1, 1969  C. BROOKS ET AL  3,436,297
REINFORCED VINYL PLASTIC STRIPPING
Filed Jan. 2, 1964

CHARLES BROOKS
THOMAS SUTTON
INVENTORS.

BY Harry Price

ATTORNEY

United States Patent Office 3,436,297
Patented Apr. 1, 1969

3,436,297
REINFORCED VINYL PLASTIC STRIPPING
Charles Brooks and Thomas A. Sutton, both of
76 N. 4th St., Brooklyn, N.Y. 11211
Filed Jan. 2, 1964, Ser. No. 335,328
Int. Cl. B32b 3/30
U.S. Cl. 161—119                     8 Claims The present invention relates to reenforced plastic vinyl stripping and it particularly relates to extruded reenforced vinyl plastic stripping.

It has been found that vinyl stripping composed of a plastic extrusion of a vinyl chloride or vinyl acetate polymer may be most readily subjected to attachment and mounting upon various types of sheet materials as a decorative trim.

It is among the objects of the present invention to provide enhanced and improved vinyl stripping of the character described, in which the stripping may be readily attached by dielectric sealing to base surfaces and in which the stripping will be quite strong and not be readily subject to breakage or removal of constituents therein which would cause it to have a short life period and tend to result in embrittlement of the material upon standing at varying temperatures under varying humidities.

Another object is to provide an improved type of polyvinyl stripping materials which will have increased strength and at the same time will be durable over long periods of time without tendency toward separation of the plasticizer therein and distintegration upon standing and exposure to heat, light and varying temperatures and humidities.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to provide a cross-section having maximum thickness adjacent the central portion thereof, which will be relatively concave in respect to its mounting face, and which will have varying thicknesses from side to side.

In one form of the invention the maximum thickness may be at the side edges, but in the preferred form of the invention the maximum thickness is centrally located, with the edges being substantially thinner.

One preferred form of the invention contemplates the provision of recesses or grooves on the interior face of the stripping so as to provide an area into which the plastic may flow upon dielectric sealing.

In an alternative form of the invention the entire top face of the extruded vinyl strip as exposed is provided with a polyethylene terephthalate surfacing or cover strip, the underface of which extruded vinyl strip, to enhance its adherence to the base upon which it is mounted, is suitably grooved or recessed so as to take up any excess polyvinyl chloride resin which is caused to be softened or to flow during the sealing procedure.

Desirably, the combination is formed of a hot plastic extruded base material and a relatively cool cover strip of polyethylene terephthalate or Mylar, which, for the purpose of assuring adhesion and integral junction, will have an under face that has been metallized with aluminum or copper and also desirably a surfacing of a vinyl adhesive material.

It has been found most suitable according to one embodiment of the present invention to first provide a thin metallized plastic stripping which is then applied to the extruded vinyl base plastic while the base plastic is in heated condition and then cooling the combined product after the combination has been made under pressure.

Surprisingly it has been found that the covering Mylar sheeting or strip may be provided with a thin metal layer to give adequate adhesive properties with the deposition of metal vapors in a vacuum. This has been found to be particularly satisfactory with relatively thick or heavy vinyl sheeting or stripping.

The amount of the recessing at the bottom face of the strip may constitute between 5 to 20% of the total crosssecion and this will permit sufficient flow area for any molten plastic to assure a close bond onto the surface to which the material may be applied without spreading to the side.

Desirably, the polyvinyl strip is also free at its edges so that the Mylar cover will be spaced .020 to .040 inch at its edge from the edge of the strip.

Upon sealing by dielectric means, the edges of the cover will then come directly into contact against the face to be sealed.

It has further been found most satisfactory to utilize this system of lamination in combination with a bottom convexly curved vinyl plastic sheet or strip or recessed bottom.

A particularly satisfactory method of applying the metal encased reenforcement is between marginal edges with the reenforcement terminating short of the marginal edges and being applied to a convex surface or to a beaded surface having bottom recesses.

The most satisfactory type of vinyl plastic is one which is composed of a polymerized polyvinyl chloride preferably in plasticized and stabilized condition.

It has been found that when this material is extruded and while in hot plastic condition, it may be combined under pressure with thin metallized Mylar sheets so that a highly permanent union is formed which will be rendered quite inseparable if the product is subjected to quick cooling as by immersing in cold water.

The most satisfactory type of lamination has been found to consist of a very thin metal layer, preferably vacuum deposited, which is encased between a nonadhesive plastic film and an adhesive plastic film.

Mylar, or polyethylene terephthalate, having a thickness ranging from one-half to two or three mils is vacuum coated with vapors of aluminum thereof on one side only, the other side being protected by rollers or stripping or masking.

It has been found that if this metallized application is less than one-half mil in thickness and desirably in the range of one hundredth to one-tenth mil, the metal is of sufficient thickness to give the greatly enhanced wetting and unification characteristics, while not of sufficient thickness to disadvantageously affect the pliability or flexibility of the vinyl strip or sheet.

The metallized terephthalate becomes unitized with a substantial integral part of the base vinyl plastic. The polyester film which has been metallized is then coated as by roller coating with a thin adhesive film of the same type of plastic as the base material to be reenforced.

For example, where the plastic is polyvinyl chloride the adhesive application is also polyvinyl chloride so that the laminating metallized sheet on this contacting surface will have the same plastic material or a similar plastic material to which a base strip is applied.

However, the plasticizers should be present in greater proportion in the polyvinyl chloride adhesive film than in the base sheet or strip. Desirably the plasticizers in the adhesive strip should be one and one-half to two times the percentage weight than those in the base strip or extruded vinyl plastic.

Where an alkyl phthalate or alkyl fatty acid ester is used as a plasticizer, the proportion in an adhesive coating should always be greater than the proportion of the base material.

The adhesive layer of vinyl chloride on the underside of the metallized surface is an essential part of the invention.

The base material upon which the stripping is attached by way of dielectric sealing is desirably formed of a panel of wood or fiber board with a layer of padding of hair felt or vinyl foam or scrap fiber, bonded together with vinyl latex and having over its top face a vinyl film to which the decorative or Mylar-covered stripping of the present invention is then applied by means of dielectric heating operations in which a radio frequency of the nature of 40 to 50 kilocycles is applied.

With the foregoing and other objects in view, the invention consists of the novel construction, combination and arrangement of parts as hereinafter will be more specifically described, and illustrated in the accompanying drawings, wherein is shown an embodiment of the inventions, but it is to be understood that changes, variations and modifications can be resorted to which fall within the scope of the claims hereunto appended.

In the drawings wherein like reference characters denote corresponding parts throughout the several views.

Figure 1:
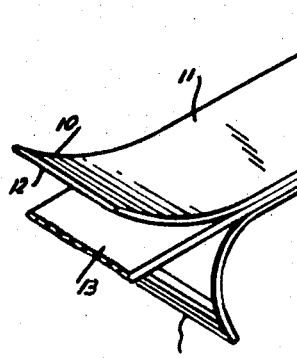
FIG. 1 is a diagrammatic perspective view showing the laminated application film.
Figure 2:
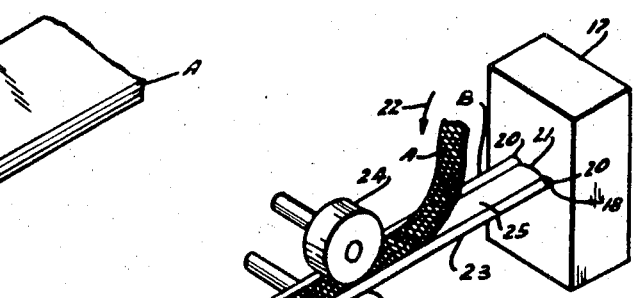
FIG. 2 is a diagrammatic perspective view showing the application of the laminated metallized structure of FIG. 1 to extruded vinyl plastic.

Referring to FIG. 1, there is shown the base polyester strip which may be of the type of polyethylene terephthalate plastic strip resin known as Mylar which is usually in very thin sheet form about one-fourth to one mil in thickness.

The top surface 11 is protected as by a cover strip or by rollers or by a removable covering and the bottom face 12 is then metallized in a vacuum by a thin vacuum deposited coating of silver, gold, tin, aluminum, copper, cobalt or nickel or combinations of these or other metals. This coating need not be more than one-tenth of a mil and may be as thin as one-hundredth of a mil.

This sheet of polyester resin 10, which is metallized on its side 12, then may be corrugated, ridged or serrated, although this process may be delayed until the adhesive vinyl coating 15 is applied to the metallized or bottom side of the strip A.

This composition strip A containing the metal 13 sandwiched between polyester and vinyl material then may be pressed onto hot semi-fluid polymerized polyvinyl chloride.

The polyvinyl chloride is desirably formed from an extrusion chamber 17 with a slot 18 having a cross-section to give a lower recessed face at 19, beaded side edges at 20 and a convexly curved surface at 21.

This hot polyvinyl chloride material containing about thirty to sixty percent of a plasticizer, such as dioctyl phthalate, or diisooctyl phthalate, or dioctyl azelate, one to two percent of barium, cadmium, tin and/or lead stearate and two to five percent of a stabilizer such as tin, barium, cadmium or zinc mercaptide is extruded at a temperature of about three hundred to four hundred fifty degrees Fahrenheit through the orifice 18.

Then the composite strip A which has been serrated and grooved is fed in the direction 22 to be formed with the extruded strip 23 and it is pressed by the pressure roller 24 into the groove 25 of the extruded material 23 as it passes over the lower base roller 26.

Figure 3:
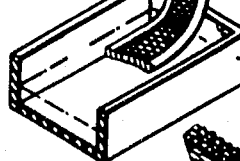
FIG. 3 is a transverse sectional view on the line 3—3 of FIG. 2 showing one type of composite structure.
Figure 4:
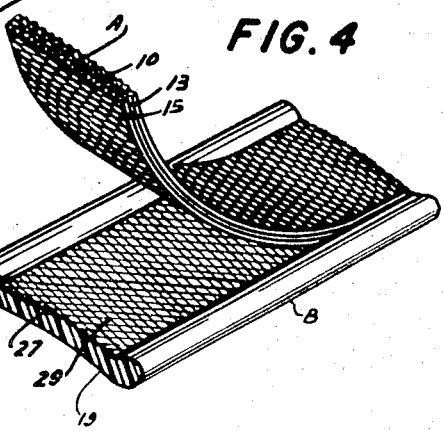
FIG. 4 is a fragmentary perspective view showing the laminated material lifted from its attachment to the extruded plastic strip to show the type of junction which is formed.

The groove or open space 19 below the strip B, however, remains so that it will form an open space when the strip of FIG. 3 is placed against a surface and sealed thereto.

The composite vinyl material or strip indicated at C may then pass into a bath D containing cold water where it will be quickly chilled and where a permanent junction will be formed.

In FIG. 3 is shown the base plastic material B with the laminated strip A pressed onto the convexly curved face 27 between the side beads 28.

The strip A will be substantially permanently retained in position but to indicate that the corrugation extends into the base strip B a portion of the cover strip A has been lifted showing the indentations at 29 on the convexly curved surface 27 where the pressure squeezes the elevations directly into the base film.

It has also been found desirable not to serrate or corrugate the applied strip but to merely press it into position, which will result in a substantially integral bond between the composite strip A and the base strip B.

Figure 5:
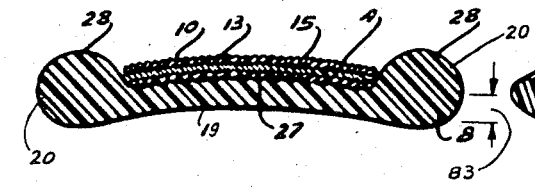
FIG. 5 is a transverse sectional view of an alternative form of cross-section similar to FIG. 3 but with a central bead instead of edge beads.
Figure 5:
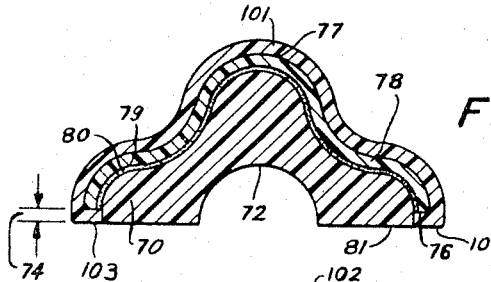
Figure 6:
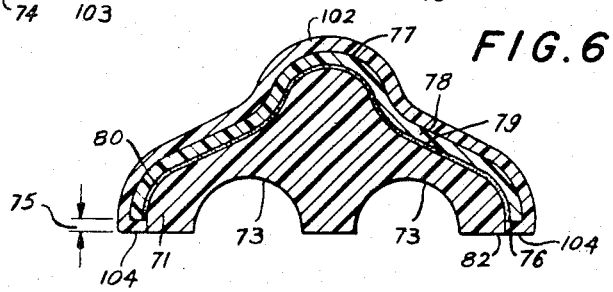
FIG. 6 is another alternative form with different types of edge beads.

In FIGS. 5 and 6 the base material 70 of FIG. 5 and 71 of FIG. 6 may consist of extruded hot copolymer of vinyl chloride and vinyl acetate or of acrylonitrile tributylstyrene, or, less preferably, of polyethylene or polypropylene.

These strips desirably have one elongated recess 72 in FIG. 5 or two elongated recesses 73 in FIG. 6, which should have sufficient volume to receive all molten polymer extending in the space 74 or 75 below the lower edge 76 of the laminate covering 77.

The laminate covering 77 may consist of a strip of Mylar 78, which has been undercoated at 79 with a thin metal surfacing and which has, applied below said metal surfacing, a thin layer 80 of a vinyl polymer adhesive. The flat face 81 of the cross-section in FIG. 5 or 82 of the cross-section in FIG. 6 may then be applied flat against a suitable mounting board or plaque, desirably having a surfacing of a thin vinyl film. This plaque may be wood or fiber board.

Then, upon application of two electrodes having a frequency of 20 to 70 kilocycles, the plastic material in the space 74 or 75 will flow into the recesses 72 or 73, permitting the edges 76 to contact the board and giving complete coverage and protection to the attached vinyl strip.

In connection with the embodiment of FIG. 3 the lower portions of the edge beads 20, as indicated by the space 83, would flow in the recess 19 and adhere to the mounting board.

Desirably, the cover strip A may also be extended over the top of the beads 28 to a point at the top of the space 83.

The present invention is particularly applicable to automotive trim applied both to the interior as well as the exterior of an automotive body. However, it may be used in general for edging or trimming various types of appliances such as electric refrigerators, kitchen cabinets, sewing machines, conditioning equipment, television and radio cabinets, and for wall moldings, junctions and strippings.

Generally, the spacing 74, 75 and 83 should not exceed about 1/32 to 1/16 of an inch and is desirably in the range of .02 to .04 inch.

The preferred cover polyester film material referred to by its trademark Mylar is made from polyethylene terephthalate which is a polymer formed by a condensation reaction between ethylene glycol and terephthalic acids.

Although the present invention has a particular application to flexible polymerized polyvinyl chloride it also has a broad application to rigid plastic, such as rigid vinyl polymers, polyethylene and also to a lesser degree to extruded cellulose acetate and butyrate.

While there has been herein described a preferred form of the invention, it should be understood that the same may be altered in details and in relative arrangement of parts within the scope of the appended claims.

In FIGS. 5 and 6, the Mylar is shown as covered by the vinyl polymer layer which may be extruded together with the base 70 or 71 or applied as a separate sheet and locked around the edges of the Mylar and joined to the base 70 and 71 by the inturned portions 103–104.

The important feature of the present invention resides in the covering of the extruded polyvinyl chloride plastic or similar plastic so that the vinyl facing of the plastic strip, after attachment, will be the Mylar facing with the Mylar facing being directly adjacent to or closely against the surface to which the attachment is made. The excess polyvinyl or other plastic below the lower edge of the facing, as indicated at 74 and 75 in FIGS. 5 and 6, will flow into the groove or elongated recess 72 and 73 at the back of the strip and the attachment as the result of the heat sealing operation will be most effective and the strip will be completely solidified and joined with the supporting face, whether it be metal, wood, fiber or plastic.

Having now particularly described and ascertained the nature of the invention, and in what manner the same is to be performed.

What is claimed is:

1. A reinforced extruded plastic stripping devoid of side beading for application and mounting upon flat sheet materials as a decorative trim by dielectric sealing, said stripping having deep longitudinally extending recessing for taking up the plastic softened and flowing during the dielectric sealing operation, said extruded strip having a flat bottom face with at least one upwardly and longitudinally deep extending groove and recess extending substantially upwardly into the body of the strip above said flat face, the strip having relatively straight lower sides and a curved convex upwardly projecting top portion and the cross-section of the strip having a maximum thickness adjacent the central portion thereof and being of decreasing thickness toward the straight sides, a covering strip covering the entire top portion of the extruded strip and extending downwardly along the side portions but terminating a substantial distance above the flat face of the extruded strip, said covering strip consisting of polyethylene terephthalate having a thin under-surfacing of vacuum deposited metal, said covering strip extending over and down along said straight sides but terminating substantially above the flat bottom side, said elongated recesses and grooves extending up into the body of the stripping to abut the lower edge of the covering having sufficient volume to receive all molten plastic polymer in the space below the lower edge of the covering strip along the straight sides, and when said excess material is all taken up, the lower edges of said covering strip being in contact with the surface to which the plastic strip is attached by dielectric sealing.

2. The plastic stripping of claim 1, said groove and recess being positioned at the bottom of the strip and extending upwardly substantially below the lower edge of the covering strip and being positioned directly opposite and below the maximum thickness of the strip.

3. The plastic stripping of claim 1, said grooves and recesses being two in number and positioned parallel to each other and on each side of the central portion of maximum thickness.

4. The plastic stripping of claim 1, said recess and groove in cross-section constituting about 20% of the total cross-section to permit a sufficient flow area for any molten plastic and therein a close bond onto the surface to which the material may be applied without spreading to the side.

5. The plastic stripping of claim 1, the edge of said covering strip being spaced at least 0.20 to 0.4 inch about the bottom flat face.

6. The plastic stripping of claim 1, said extruded plastic stripping having a covering strip with a thickness ranging from ½ to 3 mils and said metallized coating being less than ½ mil to 1/100 mil.

7. The plastic stripping of claim 1, said plastic being a polyvinyl chloride plastic.

8. The plastic stripping of claim 1, said stripping consisting of a polyvinyl chloride containing 30 to 60% of a plasticizer, 1 to 2% of stearate and 2 to 5% of a mercaptide as a stabilizer.

References Cited

UNITED STATES PATENTS

| | | | |
|---|---|---|---|
| 3,024,147 | 3/1962 | Brooks et al. | 156—209 |
| 3,046,174 | 7/1962 | Brooks et al. | 156—151 |
| 3,075,862 | 1/1963 | Hoyer | 156—273 |
| 3,113,899 | 12/1963 | Hoag et al. | 156—273 |
| 3,013,919 | 12/1961 | Bialy | 156—244 |
| 3,086,216 | 4/1963 | Brooks et al. | 156—244 |

MORRIS SUSSMAN, *Primary Examiner.*

U.S. Cl. X.R.

156—244, 273; 161—123